United States Patent
Zan et al.

(10) Patent No.: US 8,804,826 B2
(45) Date of Patent: Aug. 12, 2014

(54) METHODS AND DEVICES FOR INCORPORATING DEBLOCKING INTO ENCODED VIDEO

(75) Inventors: Jinwen Zan, Kitchener (CA); Dake He, Waterloo (CA); En-hui Yang, Waterloo (CA)

(73) Assignee: BlackBerry Limited, Waterloo, Ontario (CA)

(*) Notice: Subject to any disclaimer, the term of this patent is extended or adjusted under 35 U.S.C. 154(b) by 490 days.

(21) Appl. No.: 13/085,580

(22) Filed: Apr. 13, 2011

(65) Prior Publication Data

US 2011/0249748 A1    Oct. 13, 2011

Related U.S. Application Data

(60) Provisional application No. 61/323,383, filed on Apr. 13, 2010.

(51) Int. Cl.
  *H04N 7/50*    (2006.01)

(52) U.S. Cl.
  USPC ............ 375/240.12; 375/240.13; 375/240.16; 375/240.24; 348/394.1; 382/238

(58) Field of Classification Search
  USPC .......... 375/240.01–240.29; 348/385.1–440.1; 382/233–253
  See application file for complete search history.

(56) References Cited

U.S. PATENT DOCUMENTS

| | | | |
|---|---|---|---|
| 4,942,466 A * | 7/1990 | Sandbank et al. ....... | 375/240.01 |
| 7,535,961 B2 | 5/2009 | Cho et al. | |
| 2010/0040141 A1 | 2/2010 | Lei et al. | |
| 2010/0254448 A1 | 10/2010 | Xu et al. | |
| 2010/0322526 A1 | 12/2010 | Lee et al. | |
| 2011/0210873 A1 * | 9/2011 | Korodi et al. ................... | 341/51 |

OTHER PUBLICATIONS

He et al., "Video Coding Technology Proposal by RIM" (JCTVC-A120), Proposal for the Joint Collaborative Team on Video Coding (JCT-VC) of ITU-T SGI6 WP3 and ISO/IEC JTC1/SC29/WG11, Dresden, Germany, Apr. 15-23, 2010.
International Search Report dated Jul. 11, 2011, PCT/CA2011/050195.

* cited by examiner

*Primary Examiner* — Sath V Perungavoor
*Assistant Examiner* — Nathnael Aynalem
(74) *Attorney, Agent, or Firm* — Rowand LLP

(57) ABSTRACT

Encoders and methods of encoding that incorporate deblocking into the encoding process. An encoder performs a two-cycle encoding process. First, an original block is processed and then reconstructed and deblocked. The reconstruction and the deblocked reconstruction are compared to the original and an intermediate block is created that contains the portions of the reconstruction or the deblocked reconstruction that are more similar to the original. In the second cycle, the intermediate block serves to generate a modified original block, which is then used in a prediction process to create a new prediction block. The new prediction block as compared to the original gives new residuals. The new prediction and new residuals are entropy coded to generate the encoded video data. The new prediction block and new residuals incorporate the deblocking elements selectively identified during the first cycle, thereby eliminating the need for deblocking at the decoder. The prediction operation may be motion prediction or spatial prediction.

24 Claims, 9 Drawing Sheets

METHODS AND DEVICES FOR INCORPORATING DEBLOCKING INTO ENCODED VIDEO

CROSS-REFERENCE TO RELATED APPLICATIONS

The present application claims priority to U.S. provisional application Ser. No. 61/323,383, filed Apr. 13, 2010, and owned in common herewith.

FIELD

The present application generally relates to data compression, such as for video encoding, and, in particular, to methods and encoders for encoding data so as to alleviate the need for a deblocking process at a decoder.

BACKGROUND

The current state-of-the-art for video encoding is the ITU-T H.264/AVC video coding standard. It defines a number of different profiles for different applications, including the Main profile, Baseline profile and others.

There are a number of standards for encoding/decoding images and videos, including H.264/AVC, that use block-based coding processes. In these processes, the image or frame is divided into blocks, typically 4×4 or 8×8, and the blocks are spectrally transformed into transform domain coefficients. The transform domain coefficients are then quantized and entropy encoded. In many cases, the data being transformed is not the actual pixel data, but is residual data following a prediction operation. Predictions can be intra-frame, i.e. block-to-block within the frame/image, or inter-frame, i.e. between frames (also called motion prediction).

Rate-distortion (R-D) optimization is used to improve coding performance. Rate-distortion optimization processes have focused upon selecting a coding mode, motion vector and/or quantization step size that minimizes a rate-distortion cost expression.

At the decoder, a received bitstream that relates to inter-coded video is entropy decoded, dequantized, and inverse transformed to create reconstructed residual data. Motion vectors recovered from the decoded bitstream are used to generate a prediction from previously reconstructed frames stored in a frame store. The residual data is then combined with the prediction to produce a reconstructed frame. The reconstructed frame is then deblocked by the decoder and output as video data. The deblocking process is computationally demanding and, in some instances, it accounts for up to one-third of the processing involved in decoding.

It would be advantageous to provide for an improved encoder and methods or processes for encoding that improve R-D performance and/or alleviate some of the computational demands upon the decoder.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
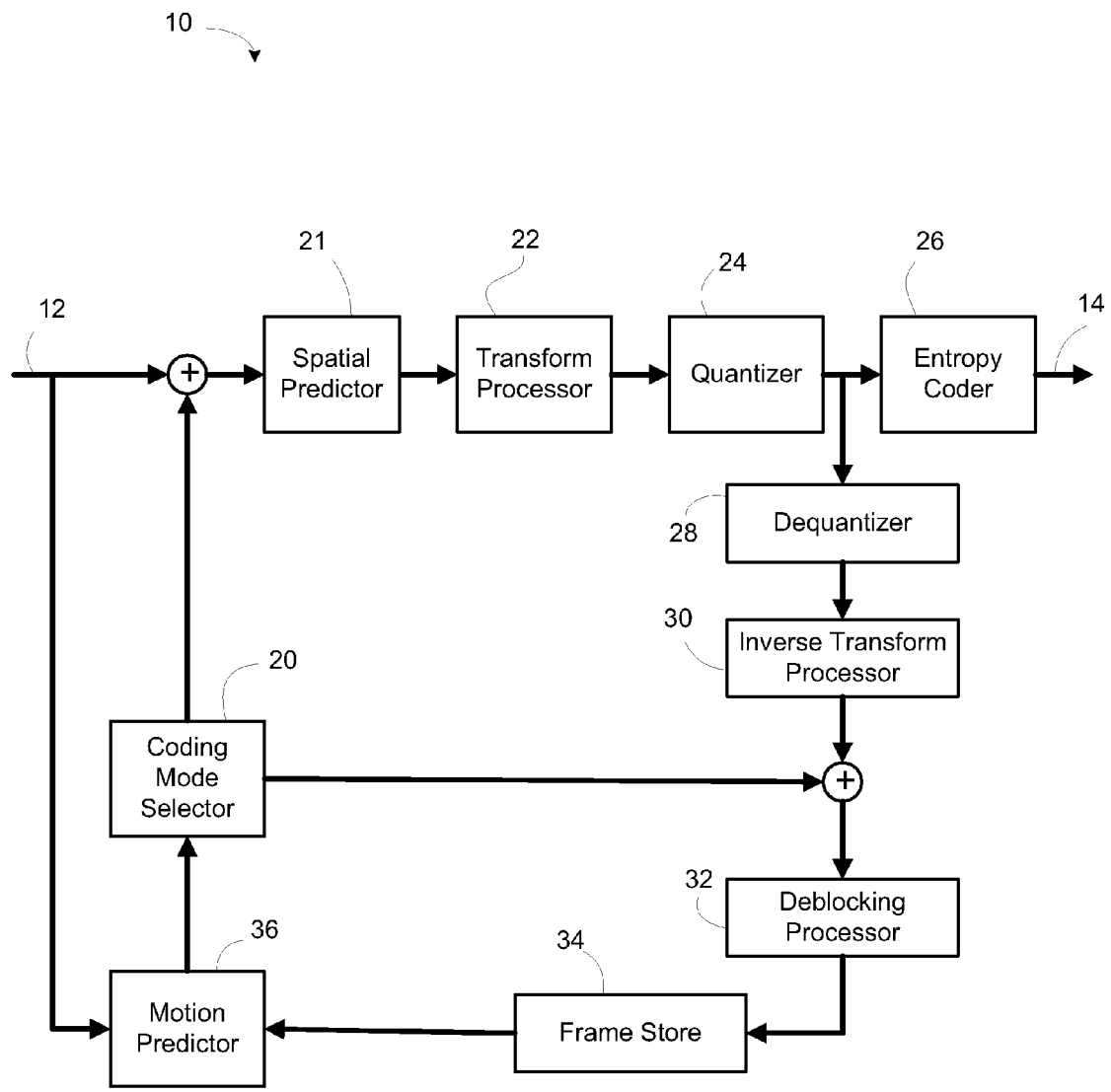
FIG. 1 shows, in block diagram form, an encoder for encoding video.

In one aspect, the present application discloses a method to generate a modified residual block using a video encoder, the encoder being configured to perform a prediction operation with regard to an original block to generate a predicted block and to determine a residual block as the difference between the original block and the predicted block, and the encoder including a feedback loop containing a deblocking filter for deblocking a reconstructed block to generate a deblocked reconstructed block. The method includes determining, by comparison with the original block, which portions of the deblocked reconstructed block are more similar to corresponding parts of the original block than are the corresponding portions of the reconstructed block; performing a modified prediction search based upon a modified original block to locate a modified prediction block, wherein the modified original block is the original block modified to incorporate the portions of the deblocked reconstructed block determined to be more similar; and generating a modified residual block from the original block and the modified prediction block.

In one aspect, the present application discloses a method of encoding a video using an encoder, the video including an original frame, the encoder having a frame store containing previously reconstructed frames, the encoder being configured to perform motion estimation with regard to the original frame to generate a predicted frame using the previously reconstructed frames and to determine a residual frame as the difference between the original frame and the predicted frame, the encoder including a transform component and a quantizer for transforming and quantizing the residual frame, and including a feedback loop containing a dequantizer and inverse transform component for producing a reconstructed residual frame, the feedback loop including a motion compensator for adding the reconstructed residual frame to the predicted frame to generate a reconstructed frame, and wherein the feedback loop includes a deblocking filter for deblocking the reconstructed frame to generate a deblocked reconstructed frame. The method includes determining, by comparison with the original frame, which portions of the deblocked reconstructed frame are more similar to the original frame than the corresponding portions of the reconstructed frame; incorporating into a refined motion prediction search for a modified prediction frame the portions of the deblocked reconstructed frame determined to be more similar; generating a modified residual frame from the original frame and the modified prediction frame; and transforming, quantizing, and entropy coding the modified residual frame to produce encoded video data.

In another aspect, the present application describes a method of encoding a video, the video including an original frame. The method includes performing motion estimation with regard to the original frame to generate a predicted frame using stored reconstructed frames and determining a residual frame as the difference between the original frame and the predicted frame; transforming, quantizing, dequantizing and inverse transforming the residual frame to obtain a reconstructed residual frame, and adding the reconstructed residual frame to the predicted frame to obtain a reconstructed frame; deblocking the reconstructed frame to obtain a deblocked reconstructed frame; generating an intermediate frame from selected portions of the reconstructed frame and the deblocked reconstructed frame; obtaining a modified original frame as the difference between the original frame and the difference between the intermediate frame and the predicted frame; performing motion estimation with regard to the modified original frame to generate a modified predicted frame using the stored reconstructed frames and determining a modified residual frame as the difference between the modified original frame and the modified residual frame; and transforming, quantizing, and entropy coding the modified residual frame to produce encoded video data.

In yet another aspect, the present application describes a method of encoding a video using an encoder, the video including an original frame, the encoder being configured to perform a prediction operation with regard to an original block of the original frame to generate a predicted block and to determine a residual block as the difference between the original block and the predicted block, the encoder including a transform component and a quantizer for transforming and quantizing the residual block, and including a feedback loop containing a dequantizer and inverse transform component for producing a reconstructed residual block, the feedback loop including a compensator for adding the reconstructed residual block to the predicted block to generate a reconstructed block, wherein the feedback loop includes a deblocking filter for deblocking the reconstructed block to generate a deblocked reconstructed block. The method includes determining, by comparison with the original block, which portions of the deblocked reconstructed block are more similar to corresponding parts of the original block than are the corresponding portions of the reconstructed block; incorporating into a refined prediction search for a modified prediction block the portions of the deblocked reconstructed block determined to be more similar; generating a modified residual block from the original block and the modified prediction block; and transforming, quantizing, and entropy coding the modified residual block to produce encoded video data.

In another aspect, the present application describes an encoder for encoding a video. The encoder includes a processor; a memory; and an encoding application stored in memory and containing instructions for configuring the processor to encode the video using one or more of the methods described herein.

In yet another aspect, the present application describes an encoder for encoding a video. The video includes an original frame. The encoder includes a frame store containing reconstructed frames; a motion predictor configured to perform motion estimation with regard to the original frame to generate a predicted frame using the stored reconstructed frames and determining a residual frame as the difference between the original frame and the predicted frame; an transform processor and quantizer configured to transform and quantize the residual frame to generate quantized transform domain coefficients; a feedback loop including a dequantizer and inverse transform processor configured to dequantizing and inverse transforming the quantized transform domain coefficients to obtain a reconstructed residual frame, and to add the reconstructed residual frame to the predicted frame to obtain a reconstructed frame; a deblocking processor configured to deblock the reconstructed frame to obtain a deblocked reconstructed frame; an intermediate frame generator configured to generate an intermediate frame from selected portions of the reconstructed frame and the deblocked reconstructed frame; a prediction refinement module configured to obtain a modified original frame as the difference between the original frame and the difference between the intermediate frame and the predicted frame, wherein the motion estimator is configured to perform motion estimation with regard to the modified original frame to generate a modified predicted frame using the stored reconstructed frames and to determine a modified residual frame as the difference between the modified original frame and the modified residual frame, and wherein the transform processor and quantizer are configured to transform and quantize the modified residual frame to generate modified quantized transform domain coefficients; and an entropy coder configured to entropy code the modified residual frame to produce encoded video data.

In yet another aspect, the present application describes a computer-readable medium having stored thereon computer-executable instructions which, when executed by a processor, configure the processor to execute the methods described above.

Other aspects and features of the present application will be understood by those of ordinary skill in the art from a review of the following description of examples in conjunction with the accompanying figures.

In the description that follows, example embodiments are described with reference to the ITU-T Reference H.264/AVC standard. Those ordinarily skilled in the art will understand that the present application is not limited to H.264/AVC but may be applicable to other data, image, or video encoding/decoding standards, including evolutions of the H.264 standard.

In the description that follows, when referring to video data the terms frame and slice are used somewhat interchangeably. Those of skill in the art will appreciate that, in the case of the H.264/AVC standard, a frame may contain one or more slices. It will also be appreciated that certain encoding/decoding operations are performed on a frame-by-frame basis and some are performed on a slice-by-slice basis, depending on the particular requirements of the applicable video coding standard. In any particular embodiment, the applicable video coding standard may specify whether the operations described below are performed in connection with frames and/or slices, as the case may be. Accordingly, those ordinarily skilled in the art will understand, in light of the present disclosure, whether particular operations or processes described herein and particular references to frames, slices, or both for a given embodiment. In general, references to a "frame" may be interpreted as including both a frame and a slice.

It will also be appreciated that some of the processes and operations described below may imply they are done on a frame-by-frame basis, but they may be done on a block-by-block basis. Block size may be arbitrary in some cases, but common block sizes for video encoding include 4×4, 4×8, 8×4, 8×8, 8×16, 16×8, 16×16, 32×16, 16×32, 32×32, 32×64, 64×32, and 64×64. In some cases, other block sizes, and even irregular blocks, may be used.

The present application relates to deblocking of pixel data. Deblocking may be understood generally to involve filtering reconstructed pixel data to remove possible processing errors or artefacts, such as the blockiness sometimes seen due to the block-based processing involved in many encoding schemes. Although the application uses the term "deblocking", this is not intended to limit the present application to one type or objective for pixel data filtering. It should be understood to refer to any such type of pixel data filtering.

Figure 2:
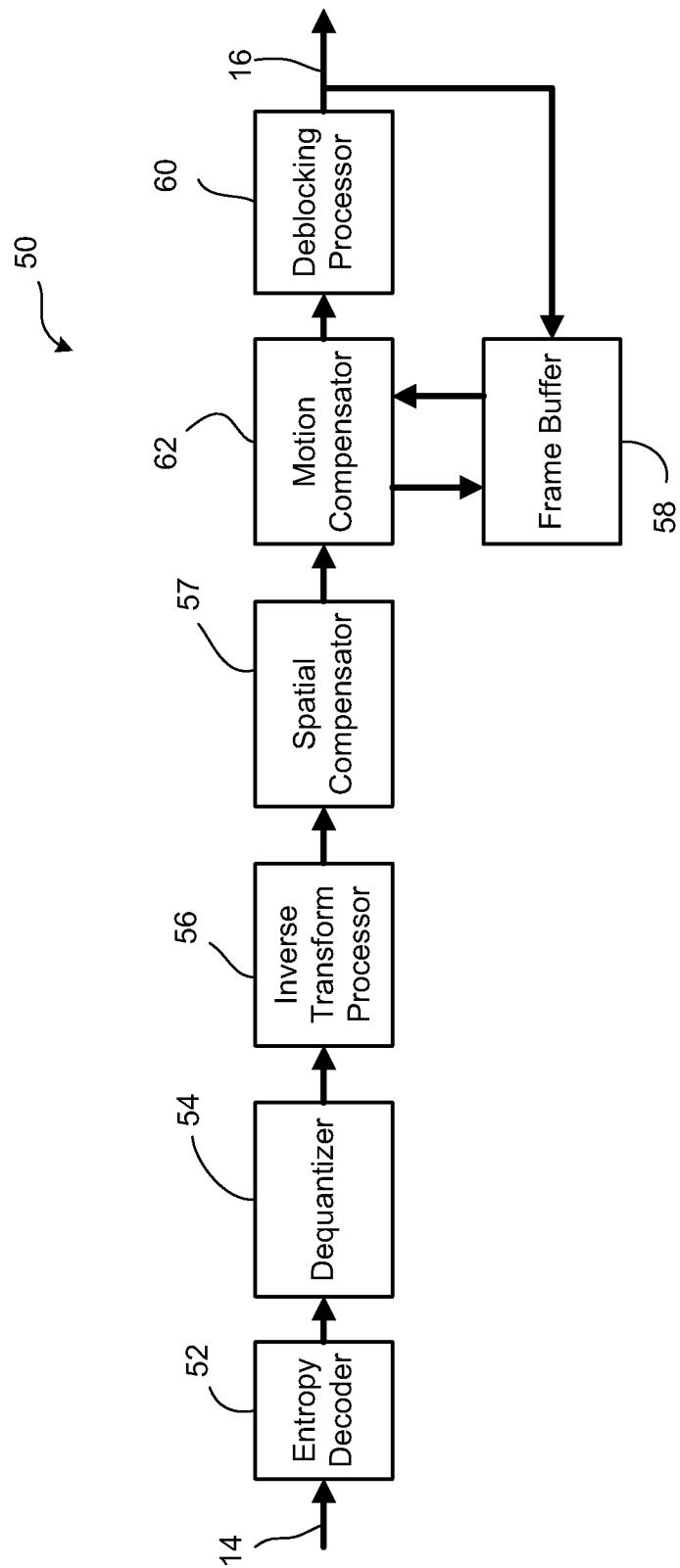
FIG. 2 shows, in block diagram form, a decoder for decoding video.

Reference is now made to FIG. 1, which shows, in block diagram form, an encoder 10 for encoding video. Reference is also made to FIG. 2, which shows a block diagram of a decoder 50 for decoding video. It will be appreciated that the encoder 10 and decoder 50 described herein may each be implemented on an application-specific or general purpose computing device, containing one or more processing elements and memory. The operations performed by the encoder 10 or decoder 50, as the case may be, may be implemented by way of application-specific integrated circuit, for example, or by way of stored program instructions executable by a general purpose processor. The device may include additional software, including, for example, an operating system for controlling basic device functions. The range of devices and platforms within which the encoder 10 or decoder 50 may be implemented will be appreciated by those ordinarily skilled in the art having regard to the following description.

The encoder 10 receives a video source 12 and produces an encoded bitstream 14. The decoder 50 receives the encoded bitstream 14 and outputs a decoded video frame 16. The encoder 10 and decoder 50 may be configured to operate in conformance with a number of video compression standards. For example, the encoder 10 and decoder 50 may be H.264/AVC compliant. In other embodiments, the encoder 10 and decoder 50 may conform to other video compression standards, including evolutions of the H.264/AVC standard.

The encoder 10 includes a spatial predictor 21, a coding mode selector 20, transform processor 22, quantizer 24, and entropy encoder 26. As will be appreciated by those ordinarily skilled in the art, the coding mode selector 20 determines the appropriate coding mode for the video source, for example whether the subject frame/slice is of I, P, or B type, and whether particular macroblocks within the frame/slice are inter or intra coded. The transform processor 22 performs a transform upon the spatial domain data. In many embodiments, the transform is a block-based spectral transform. For example, in many embodiments a discrete cosine transform (DCT) is used. Other embodiments may use other transforms, including a discrete sine transform. The transform is performed on a macroblock or sub-block basis, depending on the size of the macroblocks. In the H.264/AVC standard, for example, a typical 16×16 macroblock contains sixteen 4×4 transform blocks and the DCT process is performed on the 4×4 blocks. In some cases, the transform blocks may be 8×8, meaning there are four transform blocks per macroblock. In yet other cases, the transform blocks may be other sizes. The transform of the spatial domain data results in a set of transform domain coefficients.

The set of transform domain coefficients for each block is quantized by the quantizer 24. The quantized transform domain coefficients and associated information are then encoded by the entropy encoder 26. The entropy encoder may apply any suitable coding, including CALVC and context adaptive binary arithmetic coding (CABAC).

Intra-coded frames/slices (i.e. type I) are encoded without reference to other frames/slices. In other words, they do not employ temporal prediction. However intra-coded frames do rely upon spatial prediction within the frame/slice, as illustrated in FIG. 1 by the spatial predictor 21. That is, when encoding a particular block the data in the block may be compared to the data of nearby pixels within blocks already encoded for that frame/slice. Using a prediction algorithm, the source data of the block may be converted to residual data. The transform processor 22 then transforms the residual data into the set of transform domain coefficients. H.264/AVC, for example, prescribes nine spatial prediction modes for 4×4 transform blocks. In some embodiments, each of the nine modes may be used to independently process a block, and then rate-distortion optimization is used to select the best mode.

The H.264/AVC standard also prescribes the use of motion prediction/compensation to take advantage of temporal prediction. Accordingly, the encoder 10 has a feedback loop that includes a de-quantizer 28, inverse transform processor 30, and deblocking processor 32. These elements mirror the decoding process implemented by the decoder 50 to reproduce the frame/slice. A frame store 34 is used to store the reproduced frames. In this manner, the motion prediction is based on what will be the reconstructed frames at the decoder 50 and not on the original frames, which may differ from the reconstructed frames due to the lossy compression involved. A motion predictor 36 uses the frames/slices stored in the frame store 34 as source frames/slices for comparison to a current frame for the purpose of identifying similar blocks. Accordingly, for macroblocks to which motion prediction is applied, the "source data" which the transform processor 22 encodes is the residual data that comes out of the motion prediction process. For example, it may include information regarding the reference frame, a spatial displacement or "motion vector", and residual pixel data that represents the differences (if any) between the reference block and the current block. Information regarding the reference frame and/or motion vector may not be processed by the transform processor 22 and/or quantizer 24, but instead may be supplied to the entropy encoder 26 for encoding as part of the bitstream along with the quantized coefficients.

Those ordinarily skilled in the art will appreciate the details and possible variations for implementing H.264/AVC encoders.

The decoder 50 includes an entropy decoder 52, dequantizer 54, inverse transform processor 56, spatial compensator 57, and deblocking processor 60. A frame buffer 58 supplies reconstructed frames for use by a motion compensator 62 in applying motion compensation. The spatial compensator 57 represents the operation of recovering the video data for a particular intra-coded block from a previously decoded block.

The bitstream 14 is received and decoded by the entropy decoder 52 to recover the quantized coefficients. Side information may also be recovered during the entropy decoding process, some of which may be supplied to the motion compensation loop for using in motion compensation, if applicable. For example, the entropy decoder 52 may recover motion vectors and/or reference frame information for inter-coded macroblocks.

The quantized coefficients are then dequantized by the dequantizer 54 to produce the transform domain coefficients, which are then subjected to an inverse transform by the inverse transform processor 56 to recreate the "video data". It will be appreciated that, in some cases, such as with an intra-coded macroblock, the recreated "video data" is the residual data for use in spatial compensation relative to a previously decoded block within the frame. The spatial compensator 57 generates the video data from the residual data and pixel data from a previously decoded block. In other cases, such as inter-coded macroblocks, the recreated "video data" from the inverse transform processor 56 is the residual data for use in motion compensation relative to a reference block from a different frame.

The motion compensator 62 locates a reference block within the frame buffer 58 specified for a particular inter-coded macroblock. It does so based on the reference frame information and motion vector specified for the inter-coded macroblock. It then supplies the reference block pixel data for combination with the residual data to arrive at the recreated video data for that macroblock.

A deblocking process may then be applied to a reconstructed frame/slice, as indicated by the deblocking processor 60. After deblocking, the frame/slice is output as the decoded video frame 16, for example for display on a display device. It will be understood that the video playback machine, such as a computer, set-top box, DVD or Blu-Ray player, and/or mobile handheld device, may buffer decoded frames in a memory prior to display on an output device.

An improved video encoding process was described in US Patent Publication 2007/0217506 filed by Yang et al. Mar. 17, 2006. This publication describes a rate-distortion (RD) optimization-based iterative approach to encoding using soft-decision quantization. The contents of Yang et al. are hereby incorporated by reference. In the iterative approach described by Yang et al., the encoder fixes the quantized transform domain coefficients and uses a rate-distortion expression to find an optimal motion prediction, i.e. motion vectors, and then fixes the optimal motion prediction and uses a rate-distortion expression to find optimal quantized transform domain coefficients. The process may be iteratively repeated until a threshold is reached.

As noted above, the decoder performs a deblocking process on reconstructed frames. In many implementations, such as with H.264/AVC, deblocking is computationally expensive. The decision tree for determining whether a block border needs to be deblocked is not easily shortened and the filtering operation is computationally expensive. In some cases, almost every pixel in the frame is adjusted to some degree. This places a large burden on the processing power and speed of the decoder. In some cases, it has been observed that the deblocking process consumes approximately one-third of the processing power of an H.264/AVC compliant decoder. For decoders that are implemented on power-limited or processing-limited devices, such as mobile handheld devices, the deblocking process imposes a heavy cost.

It has also been observed that deblocking is not always advantageous. In general, deblocking tends to result in an improvement to an image/frame; however some frames, or even some portions of some frames, the deblocking produces a worse image in terms of fidelity to the original pixel data. Unfortunately, the decoder cannot know whether deblocking is advantageous or not so decoders are present configured to apply it to all frames or to none.

In one aspect, the present application proposes to have the encoder assess whether deblocking is advantageous, since the encoder has the original frame, the reconstructed frame and the deblocked reconstructed frame. It can therefore determine by comparison with the original frame whether or not deblocking is advantageous in a particular instance.

In particular, in one aspect, the present application proposes a two-cycle or two-phase encoding process. In the first cycle or phase, the effect of reconstruction and deblocking on a particular frame is evaluated. In the second cycle or phase, the particular frame is reprocessed in such a manner that deblocking effects are incorporated into the encoding of the frame in those areas of the frame in which has been seen to be advantageous. This eliminates the need to perform any deblocking at the decoder.

It will be appreciated that the process described herein results in increased computation at the encoder side, but significantly decreased computation at the decoder side. This may be of advantage to high-quality encoded video that is pre-stored on a disc or other media for later playback, since the high-quality of the video may mean large frame size and high-throughput requirement for real-time playback. It may also be of advantage in some real-time broadcast environments in which the encoder-side has significant computational resources and in which there are multiple receiving devices that likely have limited processing capability or power source limitations. One such example is a broadcast received and viewed on mobile handheld devices, such as a mobile TV broadcast or the like.

It will also be understood that the following processes and operations need not necessarily be performed on a frame-by-frame basis. In some cases, the processes and operations may be performed on a slice-by-slice basis. In general, the processes may be performed on a block-by-block basis, where the block size may range from a full frame to a small block, such as a 4×4 block. Other block sizes may include 4×8, 8×4, 8×8, 8×16, 16×8, 16×16, 16×32, 32×16, 32×32, 32×64, 64×32, and 64×64. The block size is arbitrary in many embodiments, provided the encoder is configured to carry out the prediction operation and feedback on the basis of that block size.

Figure 6:
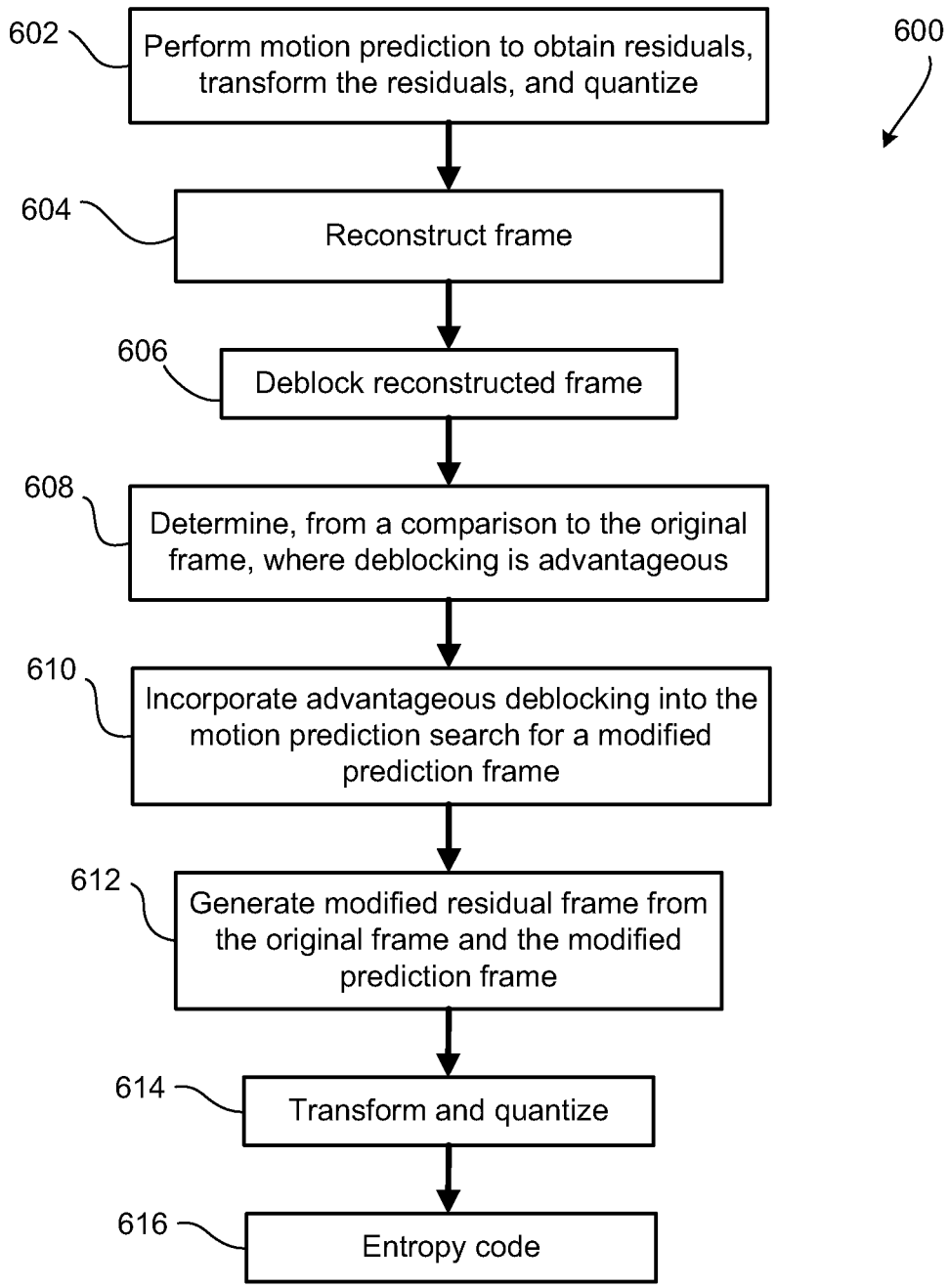
FIG. 6 shows, in flowchart for, an example process for encoding that incorporates deblocking.

Reference is now made to FIG. 6, which shows, in flowchart form, an example process 600 for encoding a video. The process 600 is described herein in the context of a frame of the video. The process 600 is for inter-coding, i.e. using motion prediction to find a prediction frame using motion vectors and previously reconstructed reference frames, although it may also be generalized to other prediction operations, such as spatial prediction, as will be described further below. The motion prediction process includes generating a residual frame as the difference between the original frame and the prediction frame. Step 602 of the process 602 reflects performance of the motion prediction operation, i.e. finding the prediction frame, generating the residual frame, and transforming and quantizing the residual frame to produce quantized transform domain coefficients.

In step 604, a reconstructed frame is created in the feedback loop of the encoder by dequantizing the quantized transform domain coefficients and inverse transforming the coefficients to produce a reconstructed residual frame. The reconstructed residual frame is then combined with the prediction frame to produce the reconstructed frame. In step 606, the reconstructed frame is deblocked using the encoder's deblocking processor to generate a deblocked reconstructed frame.

In step 608, the encoder determines, from a comparison with the original frame, whether the reconstructed frame or the deblocked reconstructed frame is a closer match, i.e. which is more similar to the original frame. This comparison may be carried out using a number of different algorithms or processes. In one example, mean squared error (MSE) may be used to assess whether the pixel data of the reconstructed frame or the pixel data of the deblocked reconstructed frame is a closer match to the pixel data of the original frame. The analysis may be performed at varying degrees of granularity. In one embodiment, the MSE comparison may be based on the whole frame. In other embodiments, the MSE comparison may be based on corresponding portions of the frames. For example, frames may be notionally divided into blocks and the comparison may be carried out on a block-by-block basis. The blocks may be arbitrary in size and shape. In one example, the blocks are selected so as to intentionally avoid alignment with macroblock boundaries to the extent possible. In one embodiment, the MSE comparison may be on a pixelby-pixel basis. The range of possible implementations will be appreciated by those ordinarily skilled in the art in light of the present description.

In step 610 the portions of the deblocked reconstructed frame that are determined to be advantageous, e.g. that result in a lower MSE against the original frame as compared to the corresponding portions of the reconstructed frame, are the incorporated into a re-running of the motion prediction process. In other words, the motion prediction process is again performed, but with the objective of finding a modified prediction frame. In this re-running of the motion prediction process, the encoder attempts to assemble the modified prediction frame that best matches a modified original frame, wherein the modified original frame is the original frame adjusted to incorporate deblocking data from the portions of the deblocked reconstructed frame determined to be advantageous in step 608. By this process, the encoder effectively builds selective deblocking into the modified prediction frame, which in the next step will then be built into the residuals.

Once the modified prediction frame is developed in step 610, then in step 612 the encoder generates a modified residual frame as the difference between the original frame and the modified prediction frame. In step 614, the modified residual frame is then transformed and quantized, and in step 616 the quantized transform domain coefficients from step 614 are then entropy encoded together with the motion vector information defining the modified prediction frame.

The output of the process 600 is a bitstream of encoded video data. The decoder that receives the encoded video data decodes it to recover and reconstruct the modified residual frame, from which it creates a reconstructed frame based on a combination of the reconstructed modified residual frame the modified prediction frame. The decoder does not need to deblock the reconstructed frame since selective deblocking has been incorporated into the residuals by the encoder.

Those skilled in the art will appreciate that further iterations of some of the steps in the process 600 may be performed to further refine and enhance the RD performance. The RD optimization described by Yang et al. in US Patent Publication no. 2007/0217506 may, in some embodiments, also be incorporated into an RD-optimized iterative encoding process together with the process 600 described above.

Figure 3:
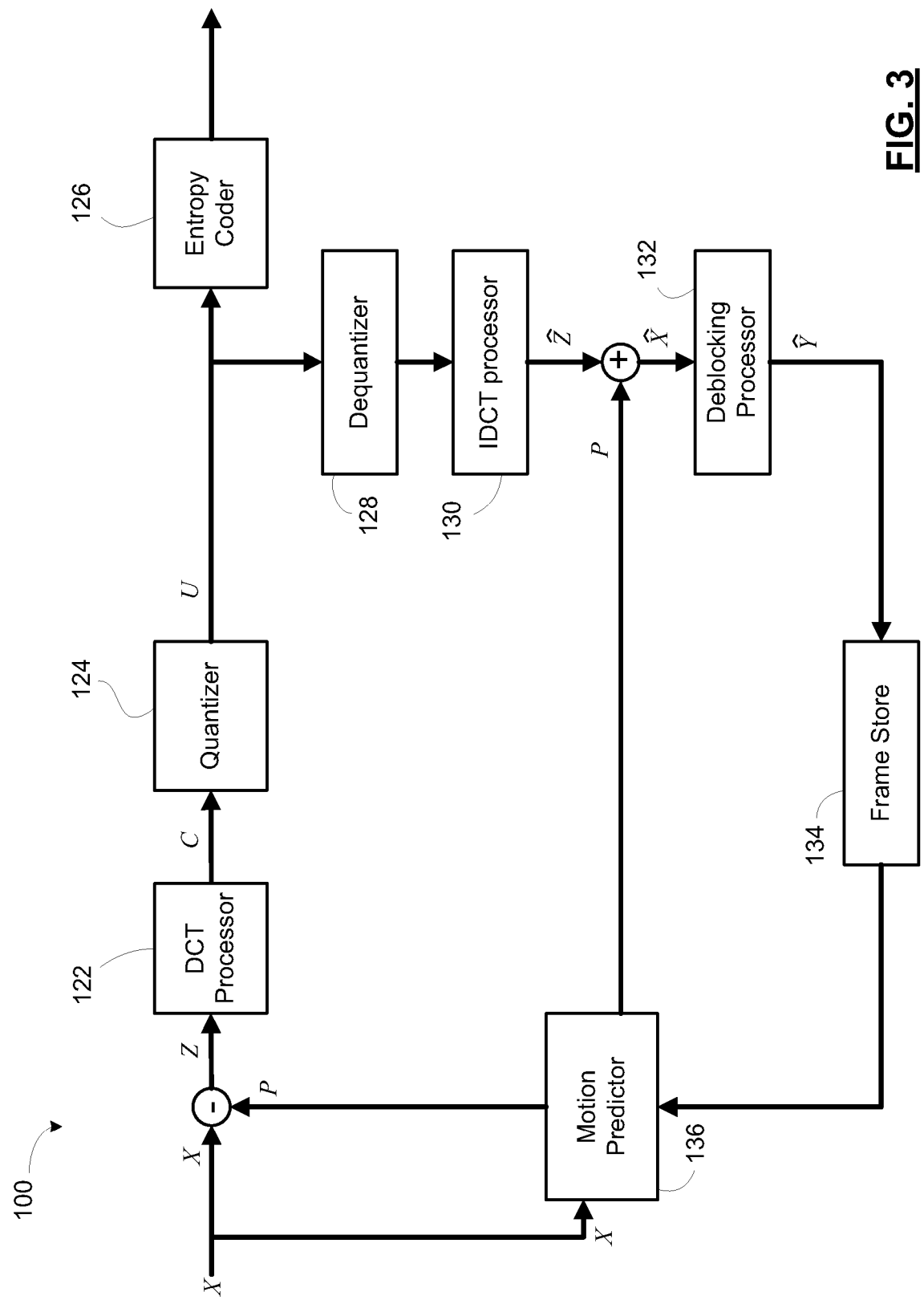
FIG. 3 shows a block diagram of an example encoder.

Reference will now be made to FIG. 3, which shows a block diagram of an example embodiment of an encoder 100 for inter-coding a video frame (or slice, etc.). The encoder 100 includes a transform processor, which in this example is a discrete cosine transform (DCT) processor 122, and a quantizer 124. The encoder 100 further includes an entropy coder 126 and a feedback loop containing a dequantizer 128, an inverse DCT (IDCT) processor 130, and a deblocking processor 132. The encoder 100 further includes a frame store 134 for storing reconstructed frames that have been previously encoded by the encoder 100 for use by a motion predictor 136 in performing motion prediction.

Although these some of the elements of the encoder 100 are referred to as "processors", such as the DCT processor 122 or the deblocking processor 132, it does not necessarily imply that these elements are implemented on dedicated or discrete processors. In many implementations, these elements may be implemented in software executed by one or more common processors. In some implementations, these elements may be implemented in dedicated hardware/software. Other implementation possibilities will be appreciated by those ordinarily skilled in the art.

In operation, the encoder 100 encodes an input original frame X by building a prediction frame P using portions of reconstructed frames from the frame store 134. The portions of reconstructed frames are specified using a set of motion vectors v. Those skilled in the art will understand that the motion prediction process carried out by the motion predictor 136 may be performed on a block-by-block basis, for example using macroblocks. The block size may be dependent upon a coding mode decision and, in many implementations, multiple possible coding modes may be evaluated on a rate-distortion basis for selecting an optimal coding mode. The process of selecting a motion vector v may include searching within a search range around an initial estimate in a reference frame. The present application does not detail the coding mode selection or motion vector search process in any detail. Those familiar with the art will appreciate that through these processes, the motion predictor 136 develops the prediction frame P that appears to provide the 'best fit' to the original frame X.

The difference between the original frame X and the prediction frame P is a residual frame Z, which is transformed by the DCT processor 122 to produce transform domain coefficients C, which are then quantized by the quantizer 124 to generate quantized transform domain coefficients U. The quantized transform domain coefficients U and the motion vectors v are then entropy coded by the entropy coder 126 and output as a bitstream x of encoded video data.

In the feedback loop, the quantized transform domain coefficients U are dequantized by the dequantizer 128 to produce reconstructed transform domain coefficients. These are then inverse transformed by the IDCT processor 130 to produce a reconstructed residual frame. The quantization and dequantization processes introduce losses that makes the reconstructed residual frame differ from the residual frame Z.

The reconstructed residual frame is then combined with the prediction frame P to generate a reconstructed frame. The reconstructed frame is then deblocked by the deblocking processor 132 to produce a deblocked reconstructed frame. The deblocked reconstructed frame is then stored in the frame store 134 to be available for use by the motion predictor 136 for encoding subsequent frames in the video.

It will be appreciated that the encoder 100 stores deblocked reconstructed frames in the frame store 134 for use in motion prediction because these are the frames that the decoder will have available to it. The decoder does not have access to the original frame X.

The fact that the encoder 100 has access to the original frame X means that the encoder 100 can make certain assessments and decisions that the decoder cannot make. This advantage is exploited in the modified encoder 200 described below.

Figure 4:
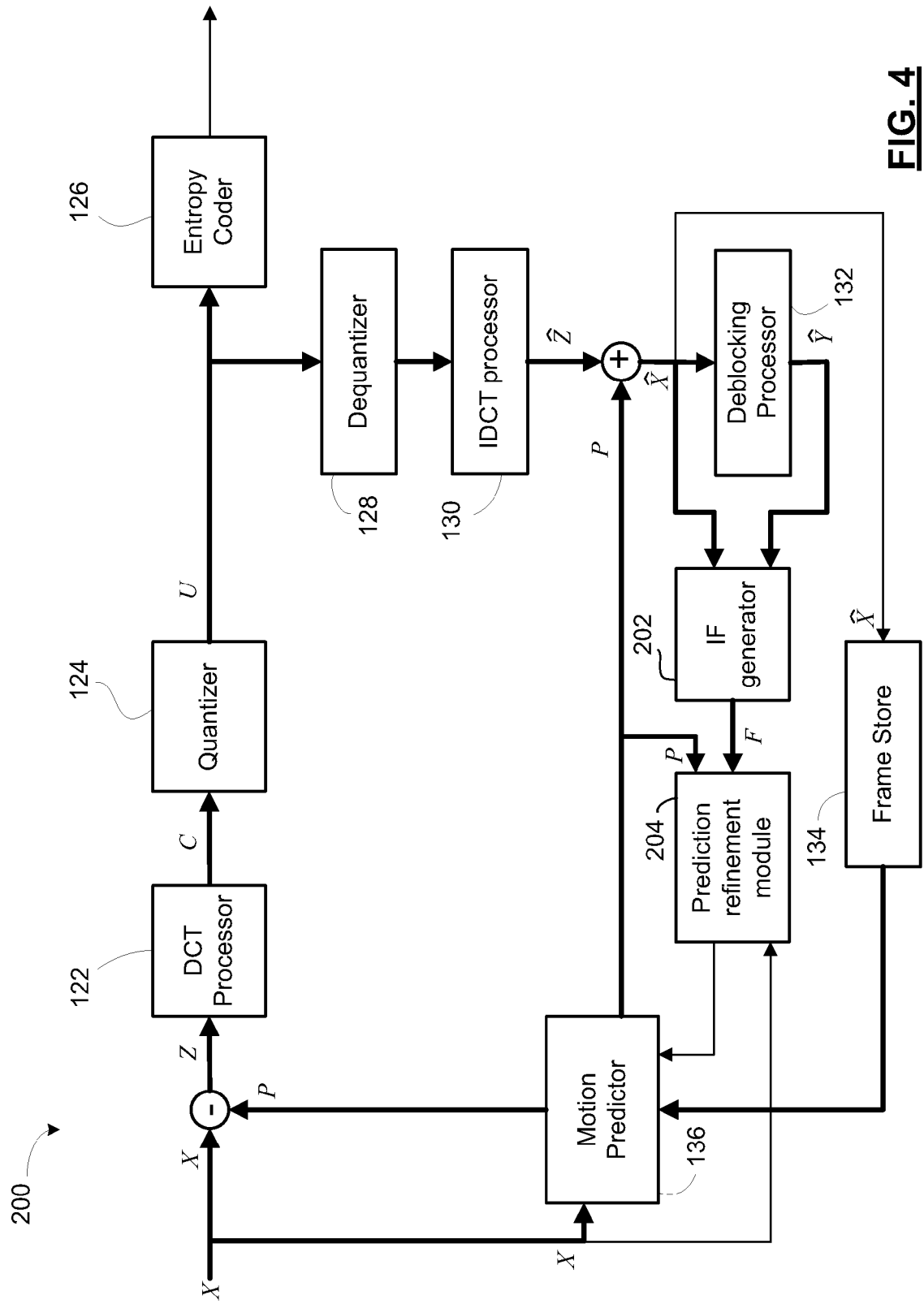
FIG. 4 shows a block diagram of an example embodiment of a modified encoder illustrating a first phase of encoding.
Figure 5:
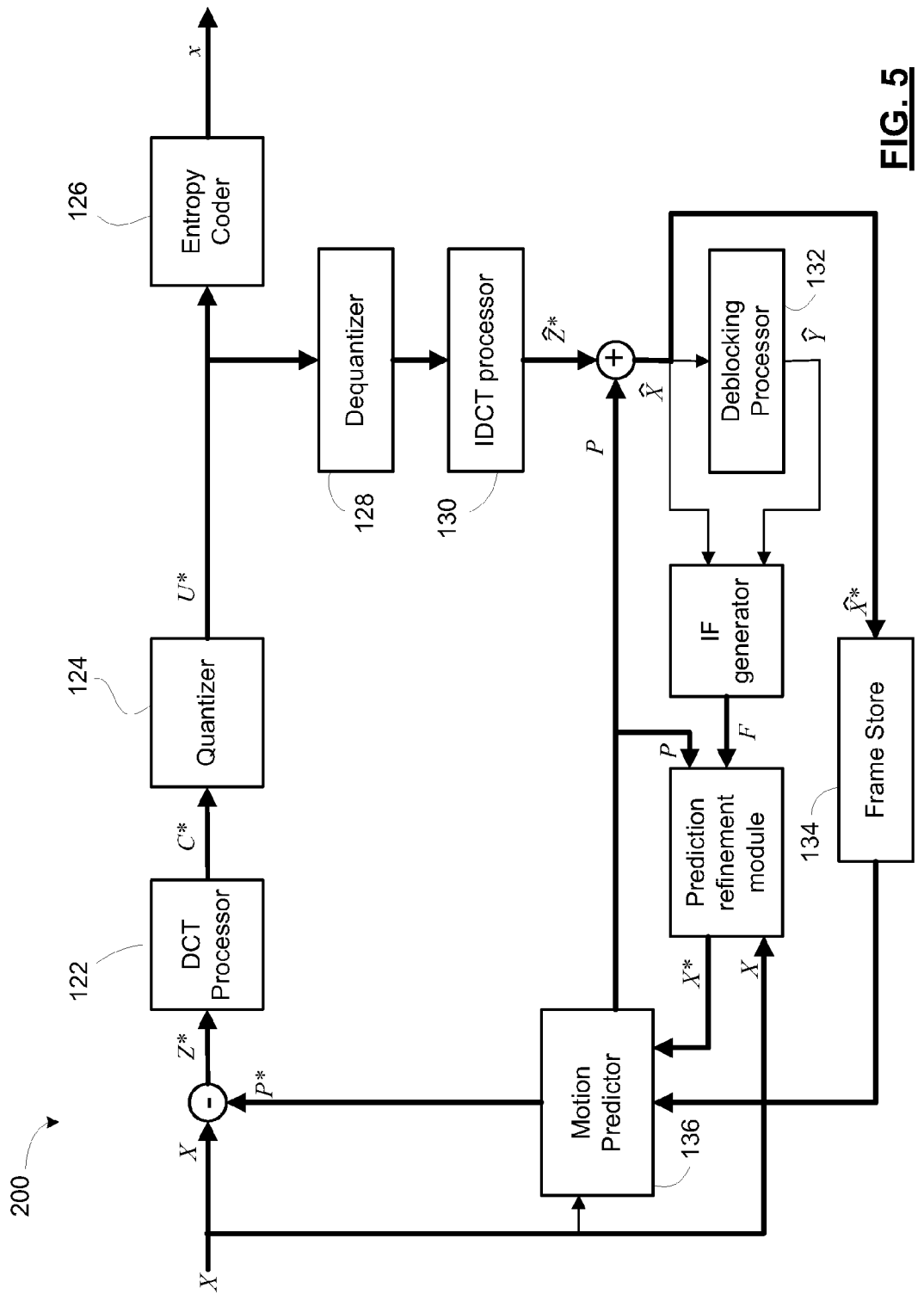
FIG. 5 shows a block diagram of the modified encoder illustrating a second phase of encoding.

Reference is now made to FIG. 4, which shows a block diagram of an example embodiment of the modified encoder 200. FIG. 4 illustrates a first phase or round in encoding using the modified encoder 200. FIG. 5, which will be described later, shows the same block diagram of the modified encoder 200 to illustrate a second or refinement phase of encoding using the modified encoder 200.

Referring first to FIG. 4, it will be noted that the encoder 200 includes the motion predictor 136, the DCT processor 122, the quantizer 124, the entropy coder 126, the dequantizer 128, the IDCT processor 130, the deblocking processor 132, and the frame store 134. The modified encoder further includes an intermediate frame (IF) generator 202 and a prediction refinement module 204. The IF generator 202 and prediction refinement module 204 modified the feedback loop so as to selectively incorporate deblocking elements into the motion prediction process such that the output residual frame after a second or refined phase of encoding has elements of deblocking incorporated into it, which thereby alleviates the need for deblocking at the decoder.

In operation, the encoder 200 performs motion prediction, DCT, and quantization as described in connection with FIG. 3, to arrive at quantized transform domain coefficients U. However, the entropy coder does not encode the quantized transform domain coefficients U at this point. The quantized transform domain coefficients U go through the reconstruction process described previously in connection with FIG. 3 to generate the reconstructed frame and the deblocked reconstructed frame. In this embodiment, however, both the reconstructed frame and the deblocked reconstructed frame are then used by the IF generator 202 to create an intermediate frame F.

The IF generator 202, in this embodiment, compares the original frame X to the reconstructed frame and the deblocked reconstructed frame to evaluate whether or not the deblocking operation results in a better match to the original frame X. As noted above, the comparison may be frame-to-frame, such that the intermediate frame F is set to match whichever of the two reconstructions best matches the original frame X. In other embodiment, the comparison may involve comparison of corresponding portions of the reconstructions against the corresponding portion of the original frame X. The portion that is more similar to the original is then incorporated into a corresponding portion of the intermediate frame F. The size and shape of the portions being compared may vary in different embodiments and may be as fine as a pixel-by-pixel comparison.

The comparison and selection made by the IF generator 202 may be based upon any measure or evaluation of distortion. In some embodiments, mean squared error (MSE) may be used as the basis for evaluating which of the two reconstructed portions more faithfully recreate the corresponding portion from the original. In some other embodiments, another metric for determining the degree of similarity between two portions may be used. For example, one embodiment may use mean absolute error (MAE), which is also referred to as sum of absolute difference (SAD).

Reference is now also made to FIG. 5. The prediction refinement module 204 receives the intermediate frame F, the prediction frame P developed earlier, and the original frame X. It generates a modified original frame X*, which is the original frame modified to incorporate selected aspects of the deblocking. In one embodiment, the modified original frame X* is given by:

$$X^* = X - (F - P)$$

The modified original frame X* is then supplied to the motion predictor 136 to serve as the baseline or "original frame" for finding a modified prediction frame P*. The modified prediction frame P* is the "best fit" to the modified original frame X* that can be assembled using motion vector-based portions of reconstructed frames found in the frame store 134. Because the modified original frame X* was modified to incorporate elements of selective deblocking, the modified prediction frame P* also reflects those elements of selective deblocking.

The modified prediction frame P* is then used in a second phase or round (e.g. a refinement phase) of encoding. The difference between the original frame X and the modified prediction frame P* results in a modified residual frame Z*. The modified residual frame Z* is then DCT processed to create modified transform domain coefficients C*, and they are quantized to produce modified quantized transform domain coefficients U*.

The entropy coder 126 entropy codes the modified quantized transform domain coefficients U* and the motion vectors v* defining the modified prediction frame P. In the feedback loop, the modified quantized transform domain coefficients U* are dequantized and inverse transformed to create a modified reconstructed residual frame*. A modified reconstructed frame* is then generated by combining the modified reconstructed residual frame* with the modified prediction frame P*. The modified reconstructed frame* is then stored in the frame store 134 without going through deblocking.

It will be appreciated that further iterations could be performed in some embodiments.

In evaluations of the processes described herein, the applicants have noted that the present processes provide better R-D performance than simply disabling the deblocking process. In fact, the resulting R-D performance of the present process of encoder-implemented-deblocking approaches and, in some cases, exceeds the R-D performance of conventional H.264/AVC in-loop deblocking. Advantageously, this R-D performance is achieved while eliminating the need to perform deblocking at the decoder. This save approximately one-third of the processing power consumed at the decoder, with the resulting benefits for battery life for decoders implemented in handheld devices or other power-limited devices.

As mentioned above, although the foregoing examples are based on a frame-by-frame process, the present application is more generally applicable to a block-by-block processes, where the block size may be as large as a full frame or as small as a 4×4 block.

In addition, although the foregoing examples refer to motion prediction and inter-coded frames, the encoder-implemented-deblocking process may be incorporated into other prediction operations. For example, the process may be applicable to deblocking in intra-coding spatial prediction.

U.S. patent application Ser. No. 12/704,662 filed Feb. 12, 2010, and owned in common herewith, describes a process of in-loop deblocking for intra-coded images or frames. With conventional intra-coding, deblocking is applied only after the full intra-coded frame is reconstructed; however, in the described process the encoder performs deblocking after reconstruction of each block and before the reconstructed block is subsequently used as source data for a spatial compensation/prediction operation for a later block in the same frame. The contents of U.S. patent application Ser. No. 12/704,662 are incorporated herein.

Figure 9:
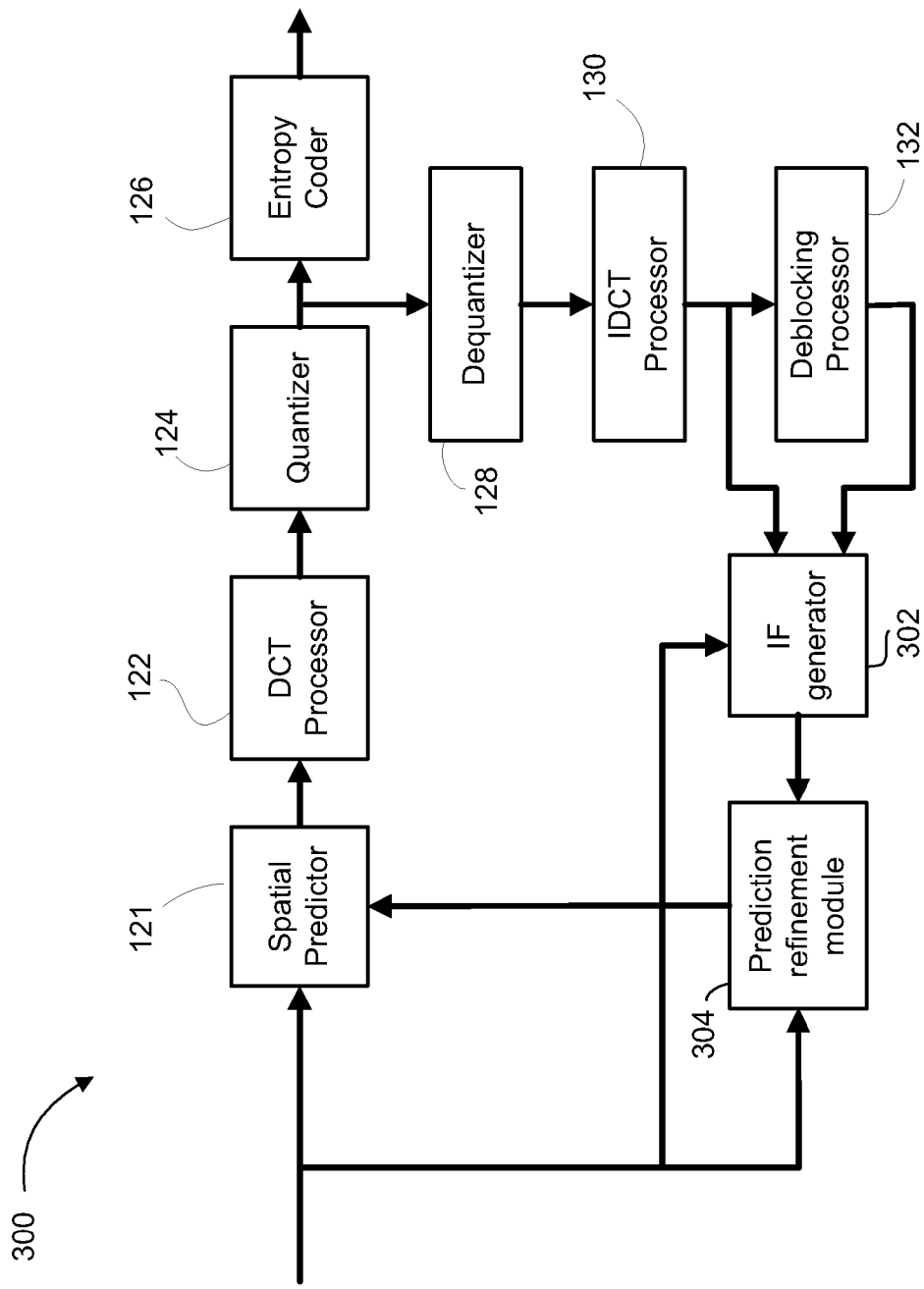
FIG. 9 shows a block diagram of an example embodiment of an encoder for intra-coding.

Reference is now made to FIG. 9, which shows, in block diagram form, an example encoder 300 for intra-coding a video frame. The encoder 300 includes the DCT processor 122, the quantizer 124, the entropy coder 126, the dequantizer 128, the IDCT processor 130, and the deblocking processor 132. It further includes a spatial predictor 121. The spatial predictor 121 is configured to attempt to represent an original block of pixel data within the original frame using a predicted block, wherein the predicted block is based upon the reconstructed pixel data from other blocks within the frame. The spatial predictor 121 represents the original block as a prediction and residual block.

In the feedback loop, the quantized and transformed residual data is dequantized and inverse transformed to produce reconstructed residual data, which is then combined with the prediction to obtain the reconstructed block. The reconstructed block may then be deblocked in an embodiment employing in-loop deblocking for intra-coded images or frames, as described in U.S. patent application Ser. No. 12/704,662.

In accordance with an aspect of the present application, the encoder 300 may include an IF generator 302 and a prediction refinement module 304 for selectively incorporating deblocking elements into the spatial prediction operation. In particular, the IF generator may generate an intermediate portion of the frame. The intermediate portion may include that portion of the frame subject to deblocking by the deblocking processor 302. The IF generator 302 may compare the deblocked and undeblocked pixel data against the same pixel data from the original frame and determined, on a portion-by-portion or even pixel-by-pixel basis, whether the deblocked or undeblocked pixel data is more similar to the original pixel data.

The intermediate portion so created is then supplied to the prediction refinement module 304. The prediction refinement module 304 generates a modified original portion for use by the spatial predictor in the prediction operation.

The process is generally similar to that described above in connection with inter-coding and motion prediction, with modifications suitable to the application to spatial prediction.

Figure 7:
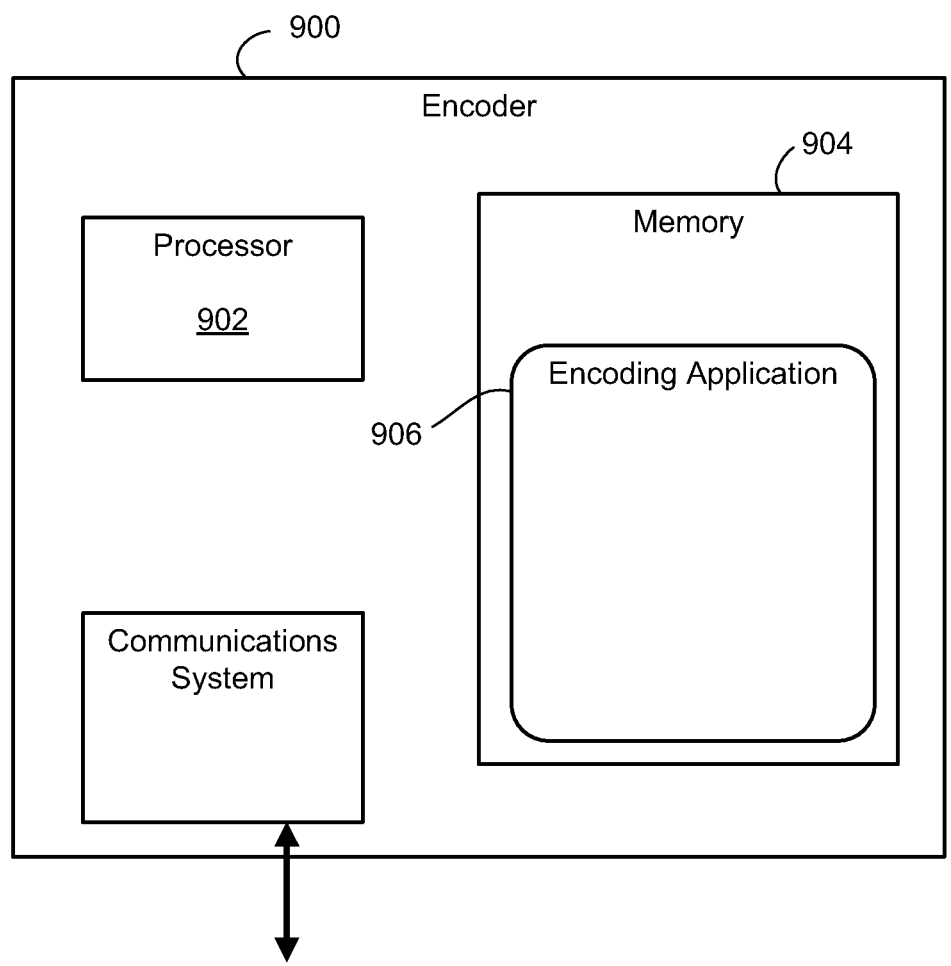
FIG. 7 shows a simplified block diagram of an example embodiment of an encoder.

Reference now made to FIG. 7, which shows a simplified block diagram of an example embodiment of an encoder 900. The encoder 900 includes a processor 902, memory 904, and an encoding application 904. The encoding application 906 may include a computer program or application stored in memory 904 and containing instructions for configuring the processor 902 to perform steps or operations such as those described herein. For example, the encoding application 906 may encode and output video bitstreams encoded using the H.264 standard or evolutions of the H.264/AVC standard. The encoding application 906 may include components or modules for implementing the IF generator and prediction refinement module described herein. It will be understood that the encoding application 906 may be stored in on a computer readable medium, such as a compact disc, flash memory device, random access memory, hard drive, etc.

Figure 8:
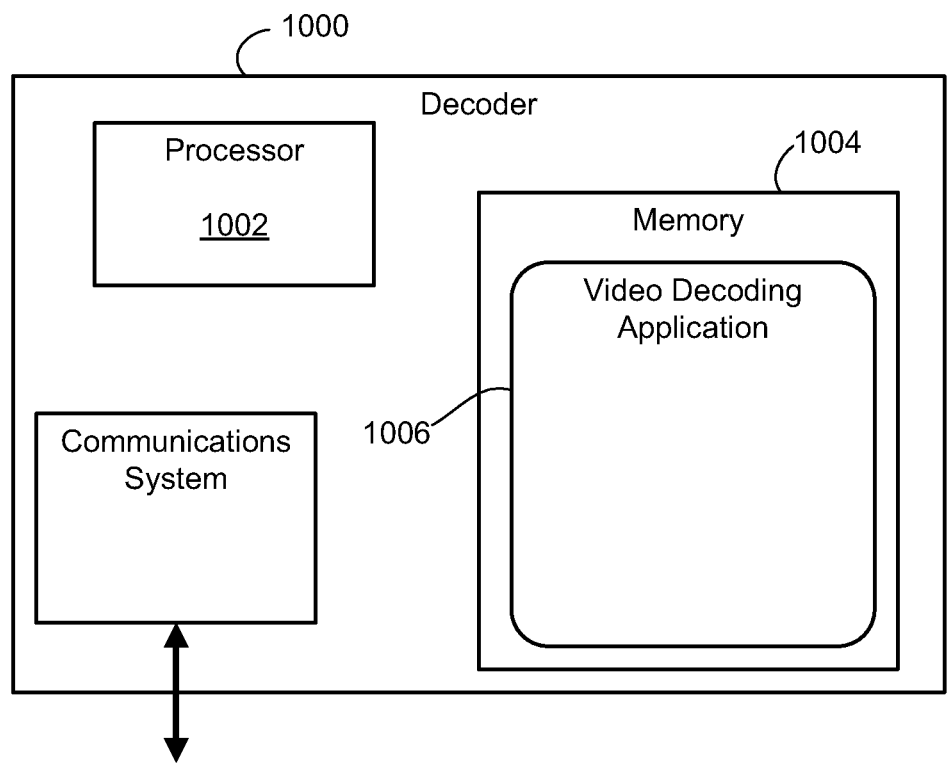
FIG. 8 shows a simplified block diagram of an example embodiment of a decoder.

Reference is now also made to FIG. 8, which shows a simplified block diagram of an example embodiment of a decoder 1000. The decoder 1000 includes a processor 1002, a memory 1004, and a decoding application 1006. The decoding application 1006 may include a computer program or application stored in memory 1004 and containing instructions for configuring the processor 1002 to perform steps or operations such as those described herein. For example, the decoding application 1006 may decode and display video bitstreams encoded using the H.264 standard or evolutions of the H.264/AVC standard. The decoding application 1006 may be configured to disable deblocking of inter-coded blocks on instructions from the encoder. It will be understood that the decoding application 1006 may be stored in on a computer readable medium, such as a compact disc, flash memory device, random access memory, hard drive, etc.

It will be appreciated that the encoder and/or decoder according to the present application may be implemented in a number of computing devices, including, without limitation, servers, suitably programmed general purpose computers, set-top television boxes, television broadcast equipment, and mobile devices. The encoder and/or decoder may be implemented by way of software containing instructions for configuring a processor to carry out the functions described herein. The software instructions may be stored on any suitable computer-readable memory, including CDs, RAM, ROM, Flash memory, etc.

It will be understood that the encoder and/or decoder described herein and the module, routine, process, thread, or other software component implementing the described method/process for configuring the encoder and/or decoder and/or any of its subcomponents or parts may be realized using standard computer programming techniques and languages. The present application is not limited to particular processors, computer languages, computer programming conventions, data structures, other such implementation details. Those skilled in the art will recognize that the described processes may be implemented as a part of computer-executable code stored in volatile or non-volatile memory, as part of an application-specific integrated chip (ASIC), etc.

In yet a further aspect, the present application discloses a computer-readable medium having stored thereon computer-executable instructions which, when executed by a processor, configure the processor to execute any one or more of the methods described above.

Certain adaptations and modifications of the described embodiments can be made. Therefore, the above discussed embodiments are considered to be illustrative and not restrictive.

What is claimed is:

1. A method to generate a modified residual block using a video encoder and two-pass encoding, the encoder being configured to, in a first pass, perform a prediction operation with regard to an original block to generate a predicted block and to determine a residual block as the difference between the original block and the predicted block, and the encoder including a feedback loop containing a deblocking filter for deblocking a reconstructed block to generate a deblocked reconstructed block, the method comprising, in a second pass:
   determining, by comparison with the original block, which portions of the deblocked reconstructed block are more similar to corresponding parts of the original block than are the corresponding portions of the reconstructed block;
   performing a modified prediction search based upon a modified original block to locate a modified prediction block, wherein the modified original block is the original block modified to incorporate the portions of the deblocked reconstructed block determined to be more similar; and
   generating a modified residual block from the original block and the modified prediction block.

2. The method claimed in claim 1, wherein the modified prediction search comprises spatial prediction.

3. The method claimed in claim 1, wherein the modified prediction search comprises motion prediction.

4. The method claimed in claim 3, wherein performing comprises
   generating an intermediate block using the portions of each of the reconstructed block and the deblocked reconstructed block determined to be more similar to the corresponding parts of the original block than the other of the reconstructed block and the deblocked reconstructed block, and
   producing a modified original block as the difference between the original block and the difference between the intermediate block and the predicted block.

5. The method claimed in claim 1, wherein determining comprises comparing each portion of the reconstructed block and the corresponding portion of the deblocked reconstructed block with the corresponding part of the original block and determining which of the portions is more similar to the corresponding part of the original block.

6. The method claimed in claim 5, wherein the comparing includes calculating a mean squared error for each of the portions against the corresponding part and determining which of the portions corresponds to the lesser mean squared error.

7. The method claimed in claim 1, wherein performing comprises a rate-distortion-based search for the modified prediction block.

8. The method claimed in claim 1, wherein the modified residual block and the modified prediction block incorporate deblocking at those portions identified during the determining operation.

9. The method claimed in claim 1, wherein the original block, the predicted block, the residual block, the reconstructed block, the deblocked reconstructed block, the modified original block, the modified prediction block, and the modified residual block comprise one of a frame, a slice, a 64×64 block, a 32×64 block, a 64×32 block, a 32×32 block, a 16×32 block, a 32×26 block, a 16×16 block, a 16×8 block, a 8×16 block, a 8×8 block, a 8×4 block, a 4×8 block, or a 4×4 block.

10. The method claimed in claim 1, further comprising transforming, quantizing, and entropy encoding the modified residual block to output encoded video data.

11. A method of encoding a video, the video including an original frame, the method comprising:
    performing motion estimation with regard to the original frame to generate a predicted frame using stored reconstructed frames and determining a residual frame as the difference between the original frame and the predicted frame;
    transforming, quantizing, dequantizing and inverse transforming the residual frame to obtain a reconstructed residual frame, and adding the reconstructed residual frame to the predicted frame to obtain a reconstructed frame;
    deblocking the reconstructed frame to obtain a deblocked reconstructed frame;
    generating an intermediate frame from selected portions of the reconstructed frame and the deblocked reconstructed frame;
    obtaining a modified original frame as the difference between the original frame and the difference between the intermediate frame and the predicted frame;
    performing motion estimation with regard to the modified original frame to generate a modified predicted frame using the stored reconstructed frames and determining a modified residual frame as the difference between the modified original frame and the modified residual frame; and
    transforming, quantizing, and entropy coding the modified residual frame to produce encoded video data.

12. An encoder for generating a modified residual block using a video encoder and two-pass encoding, the encoder being configured to, in a first pass, perform a prediction operation with regard to an original block to generate a predicted block and to determine a residual block as the difference between the original block and the predicted block, and the encoder including a feedback loop containing a deblocking filter for deblocking a reconstructed block to generate a deblocked reconstructed block, the encoder comprising:
    a processor;
    a memory; and
    an encoding application stored in memory and containing instructions for configuring the processor to, in a second pass,
        determine, by comparison with the original block, which portions of the deblocked reconstructed block are more similar to corresponding parts of the original block than are the corresponding portions of the reconstructed block;
        perform a modified prediction search based upon a modified original block to locate a modified prediction block, wherein the modified original block is the original block modified to incorporate the portions of the deblocked reconstructed block determined to be more similar; and
        generate a modified residual block from the original block and the modified prediction block.

13. The encoder claimed in claim 12, wherein the modified prediction search comprises spatial prediction.

14. The encoder claimed in claim 12, wherein the modified prediction search comprises motion prediction.

15. The encoder claimed in claim 14, wherein the encoder application configures the processor to perform the modified prediction search by
    generating an intermediate block using the portions of each of the reconstructed block and the deblocked reconstructed block determined to be more similar to the corresponding parts of the original block than the other of the reconstructed block and the deblocked reconstructed block, and
    producing a modified original block as the difference between the original block and the difference between the intermediate block and the predicted block.

16. The encoder claimed in claim 12, wherein the encoding application configures the processor to determine which portions are more similar by comparing each portion of the reconstructed block and the corresponding portion of the deblocked reconstructed block with the corresponding part of the original block and determining which of the portions is more similar to the corresponding part of the original block.

17. The encoder claimed in claim 16, wherein the encoding application configures the process to compare by calculating a mean squared error for each of the portions against the corresponding part and determining which of the portions corresponds to the lesser mean squared error.

18. The encoder claimed in claim 12, wherein the modified prediction search includes a rate-distortion-based search for the modified prediction block.

19. The encoder claimed in claim 12, wherein the modified residual block and the modified predicted block incorporate deblocking at those portions identified during the determining operation.

20. The encoder claimed in claim 12, wherein the original block, the predicted block, the residual block, the reconstructed block, the deblocked reconstructed block, the modified original block, the modified prediction block, and the modified residual block comprise one of a frame, a slice, a 64×64 block, a 32×64 block, a 64×32 block, a 32×32 block, a 16×32 block, a 32×26 block, a 16×16 block, a 16×8 block, a 8×16 block, a 8×8 block, a 8×4 block, a 4×8 block, or a 4×4 block.

21. The encoder claimed in claim 12, wherein the encoding application configures the processor to transform, quantize, and entropy encode the modified residual block to output encoded video data.

22. A non-transitory computer-readable medium having stored thereon computer-executable instructions which, when executed by a processor, configure the processor to execute the method claimed in claim 1.

23. An encoder for encoding a video, the video including an original frame, the encoder comprising:
    a frame store containing reconstructed frames;

a motion predictor configured to perform motion estimation with regard to the original frame to generate a predicted frame using the stored reconstructed frames and determining a residual frame as the difference between the original frame and the predicted frame;

an transform processor and quantizer configured to transform and quantize the residual frame to generate quantized transform domain coefficients;

a feedback loop including a dequantizer and inverse transform processor configured to dequantizing and inverse transforming the quantized transform domain coefficients to obtain a reconstructed residual frame, and to add the reconstructed residual frame to the predicted frame to obtain a reconstructed frame;

a deblocking processor configured to deblock the reconstructed frame to obtain a deblocked reconstructed frame;

an intermediate frame generator configured to generate an intermediate frame from selected portions of the reconstructed frame and the deblocked reconstructed frame;

a prediction refinement module configured to obtain a modified original frame as the difference between the original frame and the difference between the intermediate frame and the predicted frame, wherein the motion estimator is configured to perform motion estimation with regard to the modified original frame to generate a modified predicted frame using the stored reconstructed frames and to determine a modified residual frame as the difference between the modified original frame and the modified residual frame, and wherein the transform processor and quantizer are configured to transform and quantize the modified residual frame to generate modified quantized transform domain coefficients; and an entropy coder configured to entropy code the modified residual frame to produce encoded video data.

24. A non-transitory computer-readable medium having stored thereon computer-executable instructions which, when executed by a processor, configure the processor to execute the method claimed in claim 11.

* * * * *